United States Patent [19]

Janin et al.

[11] Patent Number: 5,717,452
[45] Date of Patent: Feb. 10, 1998

[54] INTERACTIVE CONTROL SYSTEM FOR MULTISERVICE INSTALLATIONS INCLUDING A TELEVISION PROGRAM DISTRIBUTION SERVER AND A PABX

[75] Inventors: Michel Janin, Meudon; Jean-Claude Nardot, Poissy, both of France

[73] Assignee: Alcatel N.V., Amsterdam, Netherlands

[21] Appl. No.: 303,204

[22] Filed: Sep. 8, 1994

[30] Foreign Application Priority Data

Sep. 9, 1993 [FR] France .................. 93 10729

[51] Int. Cl.$^6$ ................................. H04N 7/173
[52] U.S. Cl. .................. 348/7; 348/12; 348/13; 455/4.2
[58] Field of Search ................. 348/6, 7, 8, 10, 348/12, 13, 24, 461, 468, 552, 563, 564, 565; 455/3.1, 4.1, 4.2, 5.1, 6.1, 6.3; 379/90, 93, 94, 96, 95, 201; H04N 7/10, 7/173, 7/14

[56] References Cited

U.S. PATENT DOCUMENTS

| | | |
|---|---|---|
| 3,968,327 | 7/1976 | Gregg, III . |
| 4,008,369 | 2/1977 | Theurer et al. . |
| 4,150,254 | 4/1979 | Schussler et al. . |
| 4,251,691 | 2/1981 | Kakihara et al. . |
| 4,381,522 | 4/1983 | Lambert . |
| 4,616,263 | 11/1986 | Eichelberger . |
| 4,947,244 | 8/1990 | Fenwick et al. ............ 348/8 |
| 5,119,188 | 6/1992 | McCalley et al. . |
| 5,132,789 | 7/1992 | Ammon et al. ............ 348/6 |

FOREIGN PATENT DOCUMENTS

| | | | |
|---|---|---|---|
| 3522385 | 1/1987 | Germany ............ H04N 7/160 |
| 3808657 | 10/1989 | Germany ............ H04N 7/173 |
| 2207838 | 2/1989 | United Kingdom . |
| 2230160 | 10/1990 | United Kingdom ............ 348/7 |

OTHER PUBLICATIONS

Hughes et al., "Some Design Consideration for Home Interactive Terminals" IEEE Traditions on Broadcasting vol. BC-17 No. 2 Jun. 1971.

*Primary Examiner*—David E. Harvey
*Attorney, Agent, or Firm*—Sughrue, Mion, Zinn, Macpeak & Seas, PLLC

[57] ABSTRACT

A system for interactive control of applications by users to whom information can be communicated by televisions in a multiservice installation includes a television program distribution server, user modules, a PABX, and an operating system. The television program distribution server (4) has means (12,13) for transmitting television programs. The user modules (6) each include a telephone (2) with a control device connected to the PABX and a television (5) served by the server. The PABX (1) has a control and management system for controlling the individual connection of the television to the server in connection with first coded signals sent by the user through the control device of the telephone included in the same user module. The operating system includes an interactive television program from a computer and a device for producing control information usable by man or by machine from information transmitted by the PABX control and management system on reception of second coded signals sent through the control device included in the telephone in relation to specific interactive program information transmitted from the operating system and then sent to and displayed on the television of the same user module.

7 Claims, 3 Drawing Sheets

INTERACTIVE CONTROL SYSTEM FOR MULTISERVICE INSTALLATIONS INCLUDING A TELEVISION PROGRAM DISTRIBUTION SERVER AND A PABX

The invention concerns a system enabling interactive control of applications by users to whom information can be communicated by television in a multiservice installation including a television program distribution server, a private automatic branch exchange (PABX) and user modules each combining a telephone connected to the PABX and a television served by the server and which is preferably provided with a remote control transmitter device to be employed by the user.

The object of this system is to enable users to access the services provided by an information system server in the context of a given installation using the telephone and the television made available to them. It is addressed in particular to installations providing service to temporary users to whom a telephone and a television are usually made available, the classic example of which is installations for hospitals and hotels.

The services envisaged include those of the kind normally accessible via a computer connected by modem to the telephone network or an information system terminal (screen+keyboard), in particular a videotex type terminal.

For various, especially practical and economic, reasons there is no intention of systematically making computers or information system terminals temporarily available to users, as is already routine practise with televisions and telephones.

The invention therefore proposes a system whereby the televisions and telephones of an installation as outlined above can enable users of the installation to access interactive services either provided by the installation itself or provided externally of the installation and accessible through it.

This system enables interactive control of applications by users to whom information can be communicated by television in a multiservice installation including a PABX, a television program distribution server and user modules each combining a telephone connected to the PABX and a television served by the server and which is preferably equipped with a remote control transmitter device available to the user. The server is provided with means for distributing at least one interactive television program, including for this purpose information supplied to an appropriate standard (for example the videotex, VGA or other standard), this program being provided by an operations system including at least one computer.

In accordance with one feature of the invention the operations system is connected to a control and management system of the PABX and has means for producing control indications usable by man or by machine from information transmitted by the control and management system of the PABX in response to receiving coded signals sent from the control device of a module telephone, in conjunction with interactive television program information sent by the operations system to the television associated with the telephone in the same user module, and which was displayed on this television when the coded control signals were sent from the telephone in question.

The invention, its features and its advantages are explained in the following description with reference to the drawings mentioned below.

Figure 1:
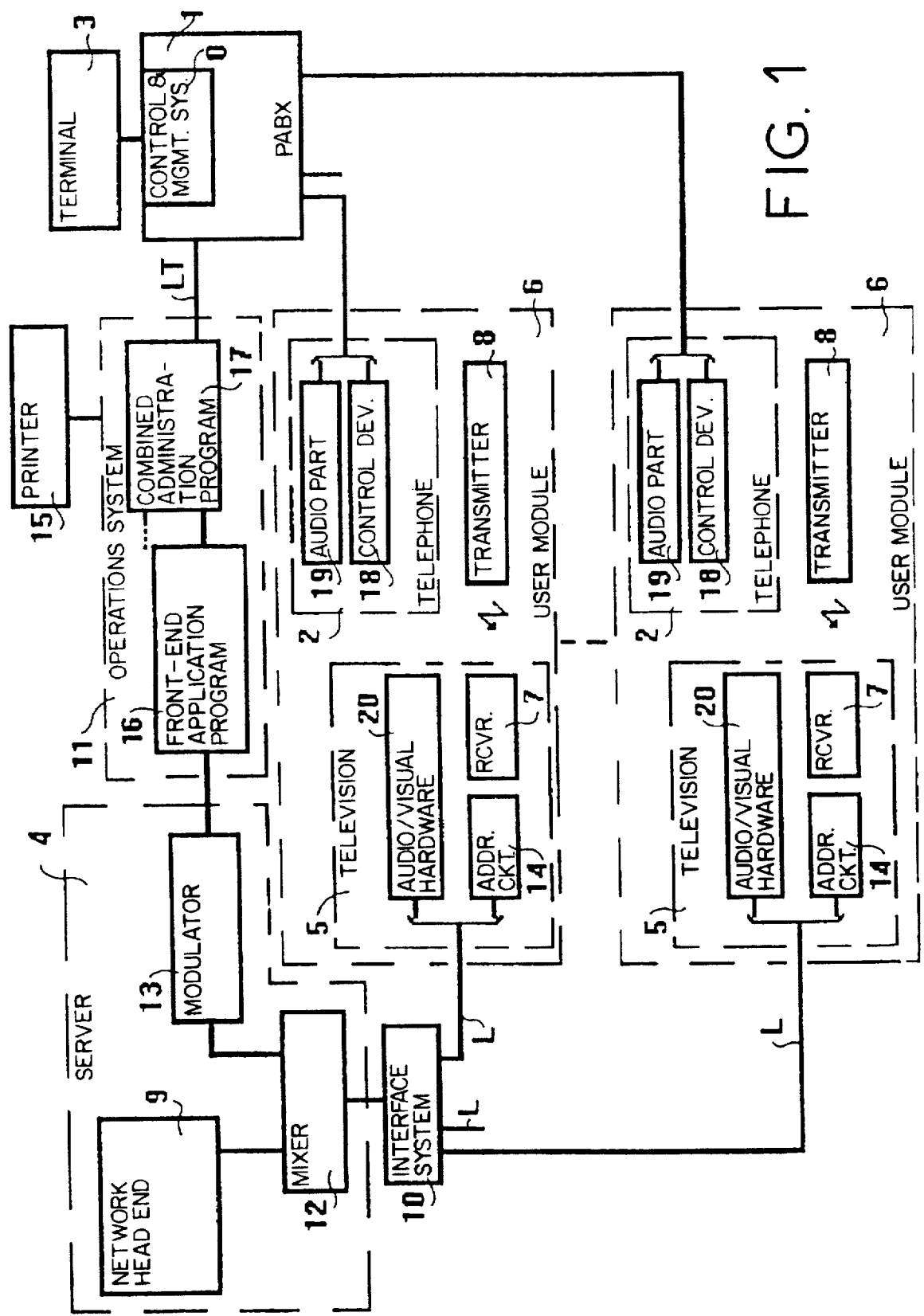
FIG. 1 shows a block diagram of an installation equipped with a system enabling interactive control of applications by users employing modules each combining a television and a telephone.

The system of the invention is designed to be used in an installation including a PABX 1 (of the usual digital type, for example) serving a plurality of telephones 2. The latter are distributed through the installation according to requirements and connected to the PABX 1 to enable users to communicate with each other and usually with other users outside the installation; in the known manner the PABX 1 is therefore connected to other PABXs by links (not shown) provided for this purpose.

The telephones 2 are preferably of the touch-tone type so that users can send digital control signals, although this is not essential.

The PABX 1 is under the control of a control and management system 0 and most of the intended installations also include a telephone operations system including at least one dedicated terminal 3. This operations system handles telephone management and in particular assignment of telephones to users so that actions carried out using a telephone can be associated with the user to whom the telephone has temporarily been assigned, in particular for billing purposes.

The installation also includes a server 4 for distributing television programs to televisions 5 made available to users of the installation.

The intended installations include user modules 6 combining a telephone 2 and a television 5 in the same place, for example in the same room provided for the use of one or more users.

The televisions 5 are preferably each provided with a remote control receiver 7 operated by a remote control transmitter device 8 supplied to users, it being understood that the televisions may instead be operated by controls on the television itself.

The devices 8 are conventional short-range infra-red remote control transmitters, for example, enabling users to select any available program to be viewed on the television and to adjust the sound and picture.

The server 4 usually includes a network head end 9 enabling it to receive television programs from various local or remote sources, including terrestrial broadcast, satellite broadcast and cable sources.

The server 4 is conventionally associated with an interface system 10 (usually a modular system) for distributing the programs received at the network head end to the various televisions, usually via distribution cables symbolically represented here by the links L.

In the known way an operations system 11 is associated with a server 4 to provide specific administration facilities in the context of the installation it serves.

An operations system 11 of this kind is used in the usual way to distribute a dedicated program through an installation, in addition to general interest programs distributed from the network head end, for example. A dedicated program of this kind supplies specific information to the users of an installation, for example information on the facilities and services made available to them by the installation.

An operations system 11 of this kind can also be used to distribute various available programs to the various televisions on a selective basis, according to requirements and/or user preferences.

French patent 2 650 464 describes one system of this kind. It entails the addition of a mixer 12 between the network head end 9 and the interface system 10 of an installation in order to insert selective control information sent to the televisions into one of the program channels which is not used for a program distributed from the network head end. The control information is produced by the operations system 11 and transmitted by a service television channel provided for this purpose, a modulator 13 being inserted between the operations system 11 and the mixer 12 to enable conversion of the control information into a form easily transmitted by a television channel. In one embodiment of the system the digital control information supplied by the operations system 11 is first FSK modulated, the resulting signals being frequency modulated for transmission on the selected service channel.

Each television 5 is preferably personalized for this purpose and includes, in addition to the standard audiovisual hardware 20, an addressable circuit 14 for identifying information specifically intended for it among all the information distributed on the service channel.

The addressable circuit 14 is associated with a demodulator (not shown) for separating data constituting the selective control information for processing addressed to an internal microprocessor from radio frequency signals conveying the pictures to be shown by the television 5 in which it is included when this television is tuned to the service channel. The addressable circuit 14 also includes storage means enabling it to retain several screen pages temporarily, to reduce access time and to make interaction more agreeable for the user.

The microprocessor of the addressable circuit 14 also handles instructions sent to the television 5 including it from a remote control transmitter device 8, allowing for constraints imposed by the operations system 11 and transmitted in the form of selective information on the service channel.

The operations system 11 includes a control unit based on at least one computer with which peripheral devices are usually associated, represented here by a printer 15.

The computer of the operations system 11 includes a front-end application program 16 responsible for generating selective control information for the interactive television program to be distributed to the various televisions 5 of the installation, in accordance with the capabilities of the installation, requirements specific to the installation and requests from users. It can also store information to be distributed via the service channel and displayed on the televisions of the installation.

This application program is not described here because it is entirely conventional in this art and does not of itself constitute any part of the present invention. A program of this kind is used, for example, in distribution systems marketed by LOCATEL which apply the teaching of French patent 2 650 464 mentioned above.

In accordance with the invention, the computer of the operations system 11 is connected to the PABX 1 by a transmission link LT so that it can dialog with the control and management system 0 of the latter, preferably in the digital domain.

A combined administration program 17 is also provided, for example in the same computer, for controlling in known manner operations which are part of the application program 16 by commands transmitted via transmission links LT from the control and management system 0 of the PABX 1 and instigated by user action at the telephone 2.

This combined administration program 17 is also organized in a manner that is known in itself to handle command input from users via the telephone 2 of the user module 6 and correlated with the interactive television program information displayed at the same time on the television 5 of the same user module.

Figure 2:
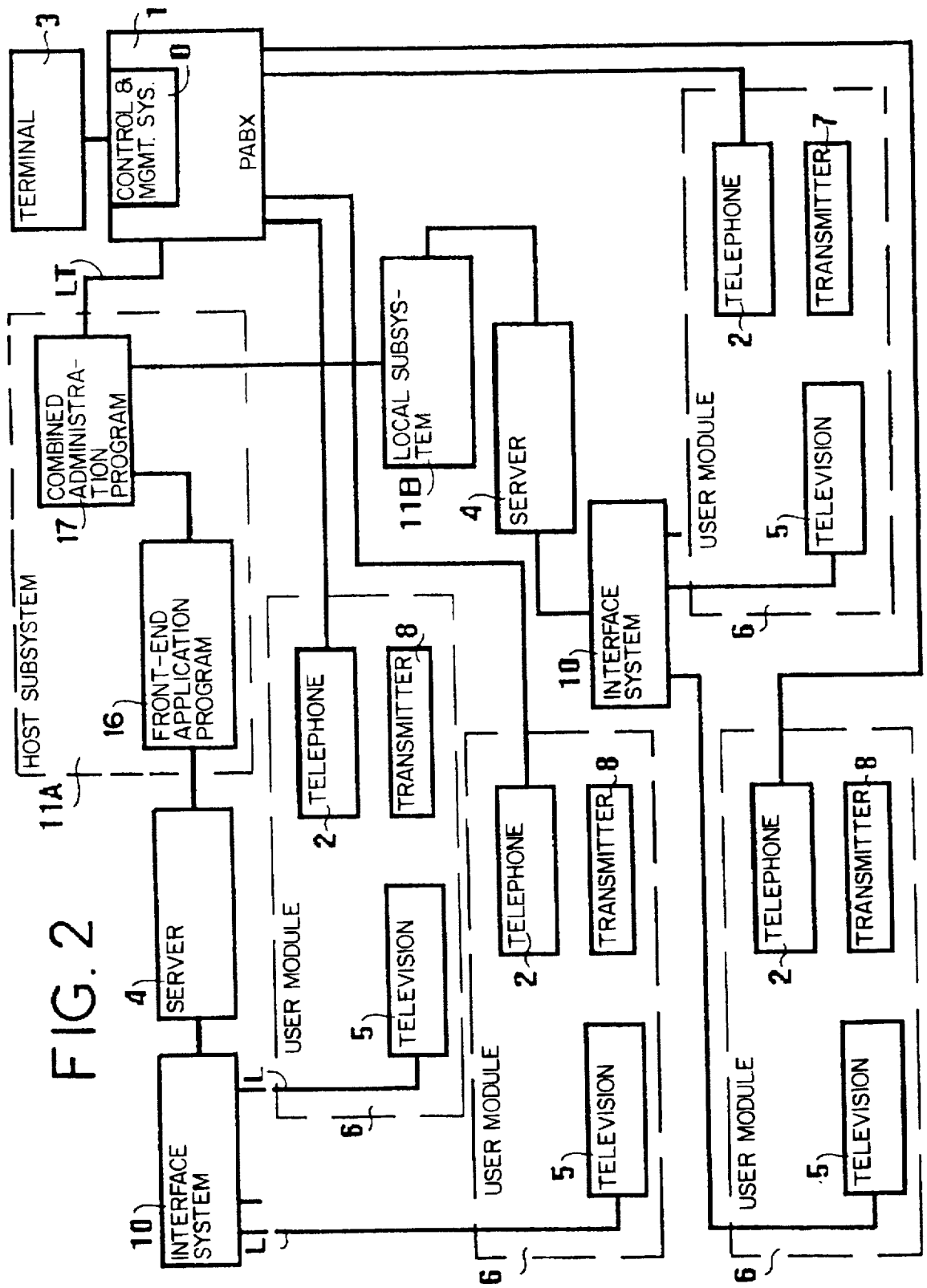
FIG. 2 shows an embodiment of the invention suitable for a system enabling interactive control of applications common to a plurality of sets of modules of one or more installations.

Note that the combined administration program 17 could be implemented separately from the application program 16, as shown in connection with FIG. 2.

A host subsystem 11A, which can be similar to the operations system 11 previously described, runs the combined administration program 17 for several local subsystems 11B which each run the application program 16 for a different group of user modules 6. Each local subsystem 11B, serving one group, is based on a computer (not shown) loaded with a copy of the application program 16. A group corresponds, for example, to an installation sharing at least one information system application with other installations connected like it to the same host subsystem 11A for this purpose.

A group can also comprise a part of an installation including a host subsystem 11A and separate local subsystems 11B, the host subsystem 11A running both programs 16 and 17 and consequently serving the user modules 6 of a group, as shown by way of example in FIG. 2.

A server 4 and one or more modules of the interface system 10 are associated with each local subsystem 11B in a manner similar to that mentioned in connection with FIG. 1 and for the same reasons.

In each of the installation examples referred to above, for example an installation as shown in FIG. 1, a user can select the interactive television program distributed via a service channel of the installation in various ways. One way is conventionally by direct action of the user at his television 5, after switching on the latter. The user can also select a program using the remote control transmitter device 8 associated with the television 5 in his user module 6, and can possibly select a program by sending a specific command using the telephone included in the same user module as the television in question. The television is then usually in standby mode in which case it is adapted to respond without preliminaries to selection of the service channel; it is possible for it to be started up either from the associated telephone by means of a command provided for this purpose or by the operations system 11.

The interactive television program offers services using a videotex type presentation, for example, with a first screen page through which various options can be accessed, possibly after one or more introductory screen pages.

If at least one of the options shown at a given time on a television 5 of a user module 6 requires the user to take some action that is not catered for by the remote control transmitter device 8, there is provision (and preferably an on-screen indication) that the corresponding command is to be entered via the telephone 2 of the same user module.

These options are in particular those requiring specific action at the operations system 11, given that as a general rule the televisions 5 referred to here and their remote control transmitter device 8, if any, have no means of communicating with the operations system.

A user in this situation is therefore prompted to use the telephone of his user module 6 to input commands in the manner indicated on the television he is watching.

The user must send the PABX 1 of the installation a first command by way of the telephone 2 in order to tell it that he is starting a command entry process, for which purpose he is requesting connection to the operations system 11 of the installation, and that commands issued from the telephone 2 once connected to the operations system are therefore intended to be transmitted to the latter, until a command to the contrary is issued from the telephone 2 or the system 11.

According to requirements and the specific capabilities of the installation, the initial request from the user can be issued in various ways by means of the control device 18 of his telephone 2, which is in addition to the audio part 19. A conventional way to do this is to press a key on the keypad, either a key specially provided for this purpose on the telephone or a key otherwise not used in normal telephone use, such as one of the additional keys marked A, B, C, D, # or * on many telephone keypads; another possibility is input via the telephone keypad of a specific number or a specific combination.

These various options can be exercised either before or after the telephone handset is lifted, depending on the installation; they can be used to switch on the television associated with the telephone in a user module.

Once the connection has been set up data identifying the telephone 2 of a specific user is communicated over a link LT to the operations system 11 from the PABX serving the user. The operations system 11 registers the user request and instigates the transmission over the service channel of data corresponding to a screen page to be displayed on the user's television, for example. In the usual way, several pages can be transmitted in succession if they do not entail the user making any choice at this stage; in this case the last page transmitted is that listing the options from which a choice is to be made.

If, as mentioned above, making a choice entails the user transmitting information to the operations system 11, then the user operates the keypad of his telephone 2 in accordance with instructions he already knows or has read previously or is reading at the time from his television 5, for example by keying a number corresponding to one of the possible choices.

The transmission of this digit by the PABX 1 to the operations system 11 leads to transmission over the service channel of digital data representing at least one screen page.

When all choices have been made, the telephone line connecting the telephone used is cleared down, either by action of the user, for example when prompted to do so on the television, or by a request from the operations system 11 to the PABX 1.

The various choices made by a user and transmitted to the operations system 11, as explained above, correspond to commands to which personnel and/or machines respond. The information can be stored temporarily prior to transmission for immediate or later execution. It can be transmitted to an appropriate system (not shown) with which the operations system 11 is able to communicate, for example, or output to an independent medium on which the choices made are recorded. For example, the choices can be hard copied by a printer connected to the operations system 11, such as the printer 15 shown in the figure.

In one embodiment of the invention the system of the invention provides more comprehensive (and possibly total) control of a television 5 from the telephone 2 of the same user module 6, via the keys of the telephone keypad, after the telephone is connected to the operations system 11 of the installation via the PABX in a manner similar to that explained above. The keys to be used for this purpose are then multifunction keys of the keypad identified specifically, for example by a visual indication such as lighting of a specific LED or showing of a specific message on a display, when they are activated to control the television. These keys can naturally be keys provided solely for this purpose on the telephone 2.

Figure 3:
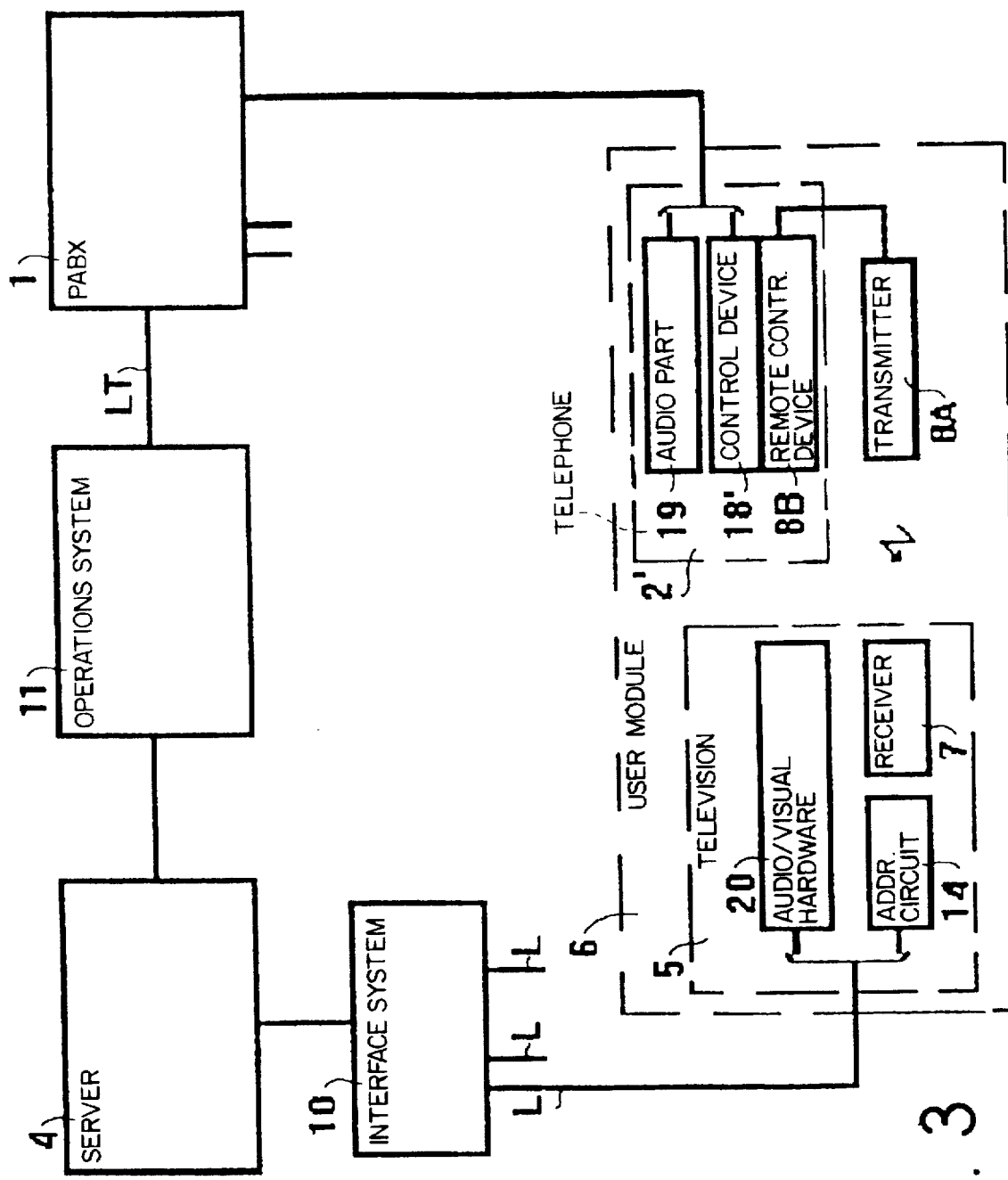
FIG. 3 shows one embodiment of the user module.

In another embodiment of the invention shown in FIG. 3, partial remote control of the television 5 of a user module 6 (essentially program channel selection and sound and picture adjustments) is achieved with no wired connection, and for example by conventional infra-red means, from the telephone 2' associated with the television in the same module 6. The wireless remote control transmitter 8A conventionally housed in a remote control device is then separated from the remainder (8B) of the device which is integrated into the control device 18' (for example the keypad) of the telephone 2 and is then connected to the telephone 2' so that it is responsive to said keypad (not shown).

The keypad then includes either keys specific to this remote control function or switching means for transmitting signals in response to operation of the keys either to the telephone line or to the remote control transmitter.

The first of these switching functions is used when the telephone 2' is employed, entailing transmission via the PABX 1 either for purely telephone use or for setting up communication with the operations system 11 for interactive control involving simultaneously the telephone 2', the associated television 5 and the operations system 11.

The other switching function is effected in situations requiring only actions operative only at the television (see above), switching from one switching function to the other being instigated by a management microprocessor in the telephone 2', for example, running a program for supervizing actuation of the keys of the telephone keypad adapted to respond to single or successive actions representing stated requirements and needs represented by the action of the user on the keypad.

In one specific embodiment of the invention the remote control transmitter 8A is intended to be at a fixed location relative to the television, which is itself in a substantially fixed position, as is conventionally the case of a television on a fixed support, for example a wall-mounted support. The remote control transmitter 8A can then be connected to the telephone by a fixed wired connection terminating at the fixed telephone jack, for example, usually wall-mounted and to which the telephone is connected by a complementary plug terminating a flexible cable for connecting the telephone.

We claim:

1. System enabling interactive control of applications by users to whom information can be communicated by televisions in a multiservice installation, comprising:

an operating system (11) based on at least one computer;

a PABX (1);

a television program distribution server (4);

user modules (6) each including at least a telephone (2) connected to the PABX and a personalized television (5) served by the server and provided with a remote control transmitter device (8) to be used by users, each server having means (11, 13) to enable transmission of at least one interactive television program supplied by said operating system (11), wherein said operating system is connected by digital means (LT) to the PABX at a control and management system (0) of the PABX and has means (16, 17) for producing control information usable by man or by machine from information transmitted in digital form by the control and management system of the PABX on reception of coded signals sent from the control device (18) of a module telephone in conjunction with specific interactive television program information previously sent by operating system to the television associated with this telephone in the same user module and displayed on that television at the time the coded control signals are sent via the telephone, the operating system (11) being divided into at least one local subsystem associated with a service and running a front-end application program (16) for implementing procedures for generating specific interactive television program information required for selection of options by the user and to be transmitted to specified televisions (5) of the installation and at least one host subsystem running a combined administration program (17) for responding to control action by any use of the installation means of a telephone (2) of a module (6) made available to the user, in conjunction with information relating to a service interactive television program displayed at this time by the television (5) of the module associated with the telephone (2) which the user is using, said host subsystem being connected by digital means to the control and management system (0) of the PABX to which the user module telephones are connected to any local subsystem of the installation.

2. A system for interactive control of applications by users to whom information can be communicated by televisions in a multiservice installation, comprising:

a television program distribution server (4) having means (12,13) for transmitting an interactive television program;

user modules (6) each including at least a telephone (2) and an identified television (5) which receives the interactive television program transmitted by the server, the telephone including a control device (18);

a PABX (1) with a control and management system which controls connection of the television to the server in connection with first coded signals sent by the user through the control device of the telephone included in the same user module, the telephone (2) being connected to said PABX; and an operating system including: means for supplying to said server the interactive television program from a computer; means for producing control information usable to generate interactive television program information, said control information being produced in response to second coded signals transmitted by the user to the operating system via the control device and the PABX while the user is viewing on the television specific interactive program information which was previously transmitted to the television from said operating system via said server; and means responsive to the control device (18) of the telephone (2) to remote control, at least in part, the television associated with the telephone (2).

3. The system according to claim 1, wherein the front-end application program is a videotex program.

4. The system according to claim 1, wherein the front end application program (16) and combined administration program are responsive to the control device (18) of the telephone (2) to remote control, at least in part, the television associated with the telephone (2).

5. The system according to claim 1, wherein telephones (2') are used to enable at least partial control of televisions associated therewith in the user modules and which individually include a control device (18') integrating a device (8B) enabling wireless remote control of the associated television from a remote control transmitter (8A) connected by wire to the telephone and preferably fixed at a short distance from the associated television.

6. System according to claim 2, wherein the operating system (11) has at least one videotex or similar type front-end application program (16) for implementing information generating procedures required for selecting options to be transmitted to televisions (5) of the installation and at least one combined administration program (17) for responding to commands input by any user by means of the telephone (2) of a user module (6) made available to the user, correlated with information relating to an interactive television program displayed at this time by the television (5) of the module associated with the telephone (2) which the user is using.

7. System according to claim 2, wherein the telephone is used to enable at least partial control of the television associated with the telephone in ones of the user modules, and wherein the control device includes a device (8B) enabling wireless remote control of the television from a remote control transmitter (8A) connected by wire to the telephone and preferably fixed at a short distance from the television.

* * * * *